3,448,021
ELECTROLYTIC PROCESS FOR SELECTIVE
ACYLOXYLATION
William J. Koehl, Jr., Yardley, Pa., assignor to Mobil Oil
Corporation, a corporation of New York
No Drawing. Filed Dec. 28, 1966, Ser. No. 605,225
Int. Cl. B01k 1/00; C07c 67/00
U.S. Cl. 204—72                                10 Claims

ABSTRACT OF THE DISCLOSURE

A method for the electrochemical preparation of acyloxy derivatives of substituted benzene compounds. For example, in the electrochemical acetoxylation of toluene, xylenes, etc., the use of a cobalt acetate catalyst produces benzyl acetates to the exclusion of phenyl acetates.

BACKGROUND

The electrochemical acyloxylation of toluene, xylene and other substituted benzene compounds has heretofore produced mixtures of phenyl and benzyl esters in varying porportions. For example, in copending patent application 399,370 (now U.S. Patent No. 3,347,758), filed Sept 25, 1964 now Patent No. 3,294,974, by the present applicant, the acetoxylation of para-xylene is disclosed. The two main products were 2,5-dimethylphenyl acetate and 4-methylbenzyl acetate. In the five runs reported in said copending application, directed to the acetoxylation of para-xylene under different conditions, the production of 2,5-dimethylphenyl acetate varied from 51 to 40% and the production of 4-methylbenzyl acetate varied from 49 to 43%. Thus it had previously been concluded that the electrochemical acyloxylation of substituted benzene compounds was inherently nonselective. A concurrently filed patent application (Serial number 606,520) by the present applicant is directed to the electrochemical acyloxylation of olefins. Non-electrochemical acyloxylation is disclosed in U.S. Patent 3,228,971.

THE INVENTION

It is an object of this invention to provide a method for the acyloxylation of substituted benzenes to produce the corresponding benzylic esters with a high degree of selectivity.

It has now been found that this objective can be achieved by conducting the acyloxylation reaction in the presence of promoters, such as cobalt acetate, preferably in the presence of a minor amount of water. This invention therefore comprises electrolyzing in the presence of inert electrodes a solution comprising an alkyl substituted benzene compound, an electrolyte, an acyloxy group, and a selectivity promoter. The presence of a solvent is preferable.

In more detail, the substituted benzene compound may be depicted as

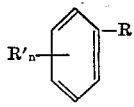

wherein R is a low molecular weight alkyl substituent having 1 to 12 carbon atoms, $n$ is an integer from 1 to 5 and R' is a substituent selected from the class consisting of hydrogen H—, alkyl R—, mononuclear aryl Ar—, alkoxy RO—, phenoxy PhO—, acyloxy R"COO—, halogen, such as chlorine, cyano NC—, carboxy R"OOC— and acylamido R"CONH— groups, wherein R is as defined above. The preferred substituents for R and R' are alkyl groups, having up to about 10 or 12 carbons, and preferably up to 6 or 4 carbons, and comprising straight or branched chain radicals. The mononuclear aryl groups are radicals like phenyl, tolyl, and the like. The R" radical may be alkyl, substituted alkyl, phenyl, or substituted phenyl, and the number of carbons in the alkyl or substituted alkyl groups may be described above. In all of the foregoing substituents, the substituent itself may have a substituting group of the kind described, i.e., an alkyl, mononuclear aryl, alkoxy, phenoxy, acyloxy, or acylamido group.

Specific compounds that may be converted to acyloxy derivatives include such alkyl benzenes as toluene, the xylenes, hemimellitene, pseudocumene, mesitylene, prehnitene, durene, isodurene, pentamethylbenzene, hexamethylbenzene, ethylbenzene, the various diethylbenzenes and polyethylbenzenes, propylbenzene, cumene, cymene, butylbenzene, etc., also alkyl benzenes with substituted alkyl side chains like (2-methoxymethyl)benzene; and tolylbenzene; also alkoxyalkylbenzenes such as p-tolyl methyl ether; also acyloxyalkylbenzenes such as acetoxytoluenes; and acylamindoalkylbenzenes like acetotoluides.

The functions of solvent, electrolyte and acyloxy group may be obtained from one or more compounds. For example, a combination of an alkanoic acid and its alkali metal salt satisfies all three of the above functions in this invention. The alkanoic acid is a suitable solvent, its alkali metal salt is an electrolyte, and each may provide acyloxy groups for reaction with the benzylic compounds.

Suitable alkanoic acids which function as a solvent for the other components of the solution and also for various products of electrolysis are the C–1 to C–10 acids, and preferably the C–2 to C–6 acids such as acetic, propionic, butanoic and pentanoic acids and their isomers, and the various hexanoic acids. Branched as well as straight chain acids are useful, including such acids as 2-methylbutyric, 3-methylbutyric, and tri-methylacetic. Other useful solvents are acetonitrile and dimethylforamamide. In general any solvent or solvent mixture may be used which dissolves the reactants, and which of course does not itself interfere with the desired reaction. Although the alkanoic acids have a low degree of ionization they may also serve as a source of electrolyte by the addition of a base to form the corresponding salts. Alternatively, the alkali metal salt of the above used acid or another, which may serve as a reactant and electrolyte, can be separately added. The salt is usually the sodium or potassium salt, although lithium and quaternary ammonium salts are suitable.

The use of a minor proportion of water, 0.5 to 2% of the total charge, is preferred. However, as illustrated in the examples this is not critical, since anhydrous solutions or substantial amounts of water may be used. Minor amounts of water improve the selectivity.

Any suitable inert cobalt salt may be used in this invention, and it may be added in the cobaltous or cobaltic state, the former being preferred because of its availability. The cobalt compound may be formed from any of the above alkanoic acids, the preferred promoter is cobalt acetate $Co(C_2H_3O_2)_2 \cdot 4H_2O$. Examples of inorganic cobalt salts are $Co(ClO_4)_2$ and $CoSO_4$. Other metals which may be chosen are those which undergo a one electron redox reaction at a potential of 1.0 to 2.0 volts such as cerium or manganese. These metals may also be used in the form of any soluble salt, inorganic or organic, such as the acetate, or from other alkanoic acids. The electrodes may be carbon or graphite, or formed from any inert metal such as copper, stainless steel, platinum, silver, nickel, lead, etc. The anode is preferably carbon, platinum or gold, whereas the cathode may be any of the above. Forms of the electrodes are conventional.

The composition range of the solution to be electrolyzed may vary widely, suitable ratios are solvent, 1:substituted benzene, 0.05–1:alkanoic acid salt, 0.05–1:water, .005–.5: and promoter, .005–.5.

The current density may be maintained over a fairly wide range, say 0.001 to 1.0, and more preferably 0.01 to 0.26, amp./sq. cm. As is known, the current density value determines the rate or speed of the electrolysis. Applied voltage is supplied by any suitable DC source.

Room temperatures are preferred, e.g., 20 to 40° C., although higher temperatures are useful, up to the boiling point of the solution. If desired, a diaphragm of conventional material may be used to separate the cathode from the anode in order to prevent possible reaction of the products formed at one electrode with those at the other. Agitation is desirable but can be omitted. The pH of the electrolyte solution may initially be on the acid side, or neutral, but preferably is on the acid side, and suitably may range from a pH of 4 to 6, more broadly from 2 to 7.

The invention may be illustrated by the following examples.

EXAMPLES 1–7

Several experiments with toluene are summarized in Table I. The reactants in each run included 20 ml. toluene and 20 ml. of potassium acetate. In all reactions the anode was carbon, the cathode was platinum. A current of 0.25 amp., 0.025 amp./cm.², at 5 to 7 v. was used for about 6 hours, and the temperature was 30 to 35° C. The reacted mixture was added to a solution of 125 g. of sodium chloride and 6 g. of ferrous sulfate in 400 ml. of water and the organic products extracted with ether. Analysis was by vapor phase chromatography.

The products include benzyl acetate, benzaldehyde, and bibenzyl. When the solution is anhydrous or when the cobalt acetate concentration is too small, tolyl acetates as well as xylenes are also formed. When the data obtained using cobalt acetate are compared with data obtained without cobalt, run 7, the catalytic effect of the cobalt can be appreciated.

Although the cobalt was added as cobalt (II) acetate, cobalt (III) was formed during the reaction. Titration of samples taken from the cell showed that the cobalt (III) concentration had increased gradually to about 25% of the total cobalt when the reaction was stopped.

and the selectivities for benzyl acetate formation are smaller.

TABLE II

| Ex. | Reactant | Product | Current Efficiency, Percent |
|---|---|---|---|
| 11 | m-Chlorotoluene, 14 g. | m-Chlorobenzyl acetate | 52 |
| 12 | p-Chlorotoluene, 14 g. | p-Chlorobenzyl acetate | 66 |
| 13 | Phenylacetonitrile, 20 g. | Alpha-cyanobenzyl acetate. | 52 |
| 14 | m-Cyanotoluene, 10 g. | m-Cyanobenzyl acetate | 13 |
| 15 | p-Cyanotoluene, 10 g. | p-Cyanobenzyl acetate | 13 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

In the light of the foregoing description, the following is claimed:

1. A method which comprises electrolyzing a solution comprising an electrolyte, a solvent, a promoter selected from metal compounds which undergo a one electron redox reaction at a potential of 1.0 to 2.0 volts, and a substituted benzene compound of the following formula:

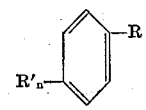

wherein R is a low molecular weight alkyl substituent having 1–12 carbon atoms, $n$ is an integer from 1 to 5, and R' is a substituent selected from the class conisting of hydrogen H—, alkyl R—, mononuclear, aryl Ar—, alkoxy RO—, phenoxy PhO—, acyloxy R''COO, halogen, cyano NC—, carboxy R''OOC— and acylamido R''CONH— groups, wherein R is as defined above, and R'' is a substituent selected from the group consisting of alkyl, substituted alkyl, phenyl, or substituted phenyl.

2. The process of claim 1 wherein said promoter is a cobalt compound of an alkanoic acid.

TABLE I

| | Reactants | | | | Current efficiency, percent | | | | Benzyl acetate in mono-acetate, percent |
|---|---|---|---|---|---|---|---|---|---|
| Example | HOAc, ml. | Ac₂O, ml. | H₂O, ml. | Co(OAc)₂·4H₂O, g. | Mono-acetate | Benz-aldehyde | Xylene | Bibenzyl | |
| 1 | 120 | | ~2 | 10 | 61 | 5.6 | | 1.8 | 100 |
| 2 | 120 | | 2 | 5 | 54 | 4.2 | | 1.8 | 100 |
| 3 | 120 | | 2 | 1 | 26 | 1.4 | 3.7 | 0.9 | ¹ 92 |
| 4 | 120 | | 20 | 5 | 30 | 2.6 | | 1.6 | 100 |
| 5 | 80 | 40 | | 10 | 27 | 2.1 | 5.3 | 0.9 | ¹ 93 |
| 6 | 80 | 40 | | 5 | 24 | 2.0 | 5.3 | 0.7 | ¹ 94 |
| 7 | 80 | 40 | | None | ² 2.5 | | 14 | 0.4 | 26 |

¹ The remainder is o- and p-tolyl acetates.
² Includes tolyl acetates.

EXAMPLES 8–9

Using the same concentrations as in Example 1, m-xylene yielded 3-methylbenzyl acetate with a current efficiency of 46%. p-Xylene (same conditions as Example 2) gave 4-methylbenzyl acetate, 62% current efficiency. No other monoacetates were detected in either case. Small amounts of other compounds including methyl benzaldehydes and diacetates were found.

EXAMPLE 10

Ethylbenzene was reacted under the same conditions as Example 2. The products were 1-phenylethyl acetate and acetophenone with current efficiencies of 59% and 6%.

EXAMPLES 11–15

Table II presents the data for a series of examples in which the procedure employed was the same as that for Example 2. In each of these examples cobalt is essential. Without cobalt the current efficiencies for acetoxylation 3. The process of claim 1 wherein said solvent is an alkanoic acid having 1 to 10 carbon atoms.

4. The process of claim 3 wherein said alkanoic acid is acetic acid.

5. The process of claim 1 wherein said electrolyte is an alkali metal salt of an alkanoic acid having 1–10 carbon atoms.

6. The process of claim 5 wherein said electrolyte is an alkali metal salt of acetic acid.

7. The process of claim 1 wherein said solution contains 0.5 to 2% water.

8. The process of claim 1 wherein the solution includes the following ratios of compounds: solvent, 1:substituted benzene, 0.05–1:electrolyte 0.05–1:water 0.005–.5:and promoter 0.005–.5.

9. The process of claim 1 wherein the electrolysis is carried out with a current density of 0.001 to 1.0 amp./ sq. cm.

10. The process of claim 1 wherein R and R' are low molecular weight alkyl substituents having 1–6 carbon atoms, and $n$ is the integer from 1 to 3.

References Cited

UNITED STATES PATENTS 3,252,876   5/1966   Koehl _____ 204—59
3,252,878   5/1966   Koehl _____ 204—59
3,397,226   8/1968   Fenton _____ 204—78

JOHN H. MACK, *Primary Examiner.*

H. M. FLOURNOY, *Assistant Examiner.*

U.S. Cl. X.R.

204—59